United States Patent Office 3,360,978
Patented Jan. 2, 1968

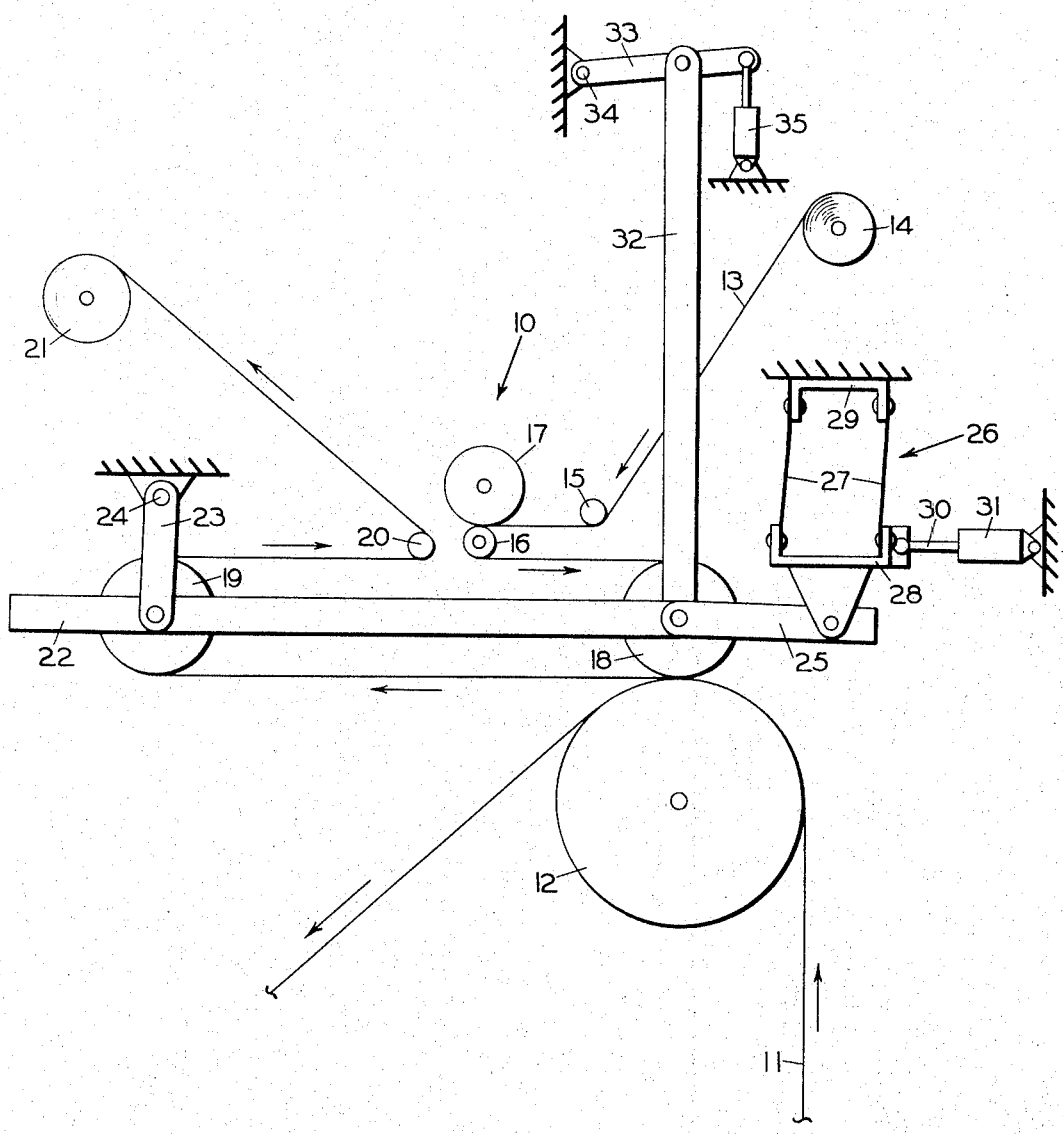

3,360,978
CONTINUOUS FRICTION MEASUREMENT
OF WEB SURFACES
Dalton L. Shinn, Camas, Wash., assignor to Crown Zellerbach Corporation, San Francisco, Calif., a corporation of Nevada
Filed Jan. 3, 1966, Ser. No. 518,238
4 Claims. (Cl. 73—9)

This invention relates to a process and apparatus for continuously measuring the surface friction characteristics of moving webs. This invention also relates to measuring the degree of electric discharge treatment of polyolefin films.

It would be desirable for many purposes to be able to measure the surface friction characteristics of moving webs of material. For paper webs, both coated and uncoated, it is desirable for many purposes to know the degree of "smoothness" of the web. For polymer films it is desirable to know the "slip" characteristics of the film. Until now there has been no satisfactory procedure for determining such characteristics during the actual manufacture of the webs or films. The conventional procedure for determining surface friction characteristics of such webs calls for samples of the finished product to be taken and tested on smoothness or slip testers. Such procedures cannot be effected upon the web during its formation, and the time lapse between taking a sample of the web and running the friction test did not permit rapid correction of process variables if the web's friction characteristics were not those desired.

Polyolefin film, such as polyethylene and polypropylene is commonly treated with an electric corona discharge surface treatment to increase the degree of adhesion of inks and coatings to the film surface. The degree of treatment is variable and may be controlled. It is desirable to be able to determine the degree of treatment as it relates to the improved adhesive qualities of the film for receiving inks and coatings. In the past the degree of treatment has been measured by taking a sample of treated film, printing on it with ink, applying an adhesive tape to the printed area and stripping the tape therefrom, the degree of treatment being correlated with the amount of ink stripped from the film. While this test gives some measure of the degree of treatment of film surfaces, it has the drawback of being dicontinuous, and such a test does not determine the degree of surface treatment within a period of time short enough to permit process conditions to be changed quickly to bring the degree of treatment into line with that desired.

Accordingly, it is the principal object of this invention to provide a process and apparatus for continuously and substantially instantaneously measuring the surface friction characteristics of a continuous web of material.

Briefly, the invention comprises continuously moving in contact with a surface of a moving web a continuously renewed reference surface, the reference surface moving at a different velocity from the web, and measuring the relative friction betwen the surface of the moving web and the reference surface. The relative friction measurement thus obtained is correlated with conventional surface characteristics tests. The particular webs employed may be any whose surface friction characteristics it is desired to determine, such as polymer films and paper webs, both coated and uncoated.

The surface characteristics maesured are, of course, all related to the slurface frictional characteristics. Thus, for polymer films, the "slip" characteristics of the film surface may be determined continuously during the formation thereof. "Slip" is a measure of the force required to overcome the clinging together of films and to move the film in contact with itself, and is usually considered the antithesis of coefficient of friction. Previously, the slip characteristics of polymer films could only be determined after the film had been manufactured and removed for testing purposes by employing such devices as the Thwing-Albert slip tester which measures the coefficient of friction of the surface of the film. The frictional characteristics of the moving web material is also a measure of the relative smoothness of the web and the process and apparatus of this invention therefore has utility in determining the surface smoothness of polymer films and coated and uncoated paper webs.

It has also been further determined that, quite surprisingly, the frictional characteristics of a moving web of polyolefin film is related to the degree of electric discharge treatment thereof. As previously mentioned, polyolefin webs are commonly treated with an electric corona discharge in order to improve the receptivity of the surface of the film to inks and coatings. By employing the process and apparatus of this invention, the surface frictional characteristics of such treated films may be determined and correlated to the degree of electric discharge treatment thereof.

One of the objections to previous discontinuous methods of determining frictional properties of a surface was that such methods employed moving an object in sliding contact with the surface to be investigated and such moving contact with the surface changed the reference surface due to a wearing away thereof by the frictional forces involved. The present invention overcomes this difficulty by employing a reference surface which is continuously renewed. This is effected in practice by employing as the reference surface a moving strip of material such as paper, film or foil. The reference web is continuously unwound, brought into contact with the moving surface whose surface friction characteristics it is desired to determine, and, after contact therewith, wound up on a second roll and eventually discarded. The particular material employed as the reference surface is not believed to be critical, although it should not be a surface such as will be detrimental to the web whose surface characteristics is being determined such as by causing undue scratching of the web surface. The paper, film or foil employed may be coated or uncoated. Of course, however, once a particular reference surface is chosen, it should be employed for all tests that are to be directly compared as the correlation between the frictional characteristics obtained and the surface characteristics of the web it is desired to investigate will depend to a certain extent upon the particular friction characteristics of the reference surface itself. The reference surface should obviously have uniform surface friction characteristics.

Referring now to the drawing, there is illustrated one embodiment of a suitable form of apparatus for continuously determining the surface characteristics of a moving web of material in accordance with the present invention.

In the drawing, the friction measuring apparatus is generally indicated by reference number 10, and measures the surface friction characteristics of a moving web of material 11 passing over roll 12.

The reference surface is a narrow strip of material 13 which is fed from supply roll 14. Supply roll 14 may have suitable clutch means associated therewith to stabilize the unwind velocity of strip 13 and thereby prevent a pulsing feed rate.

Reference strip 13 is fed around breaker bar 15 into the nip formed between drive roll 16 and nip roll 17. Drive roll 16 is powered by any suitable motive means such as an electric motor, not shown. Nip roll 17 is spring loaded into contact with drive roll 16. The purpose of this is to prevent slippage of strip 13 around drive roll 16 which would otherwise occur due to the difference in velocities of strip 13 and web 11.

From drive roll 16, strip 13 passes around roll 18 and into the nip formed between rolls 12 and 18. In the nip between rolls 12 and 18, reference strip 13 is brought into frictional engagement with web 11.

From roll 18, strip 13 passes around roll 19, which is the same size as roll 18, around breaker bar 20 and onto driven windup roll 21.

Paired rolls 18 and 19 are connected by suitable journal means at their axles to a pair of parallel beams 22 (only one of which is visible in the drawing). Roll 19 and beams 22 are free to move back and forth in a direction substantially parallel to the lower path of travel of strip 13 by virtue of frame member 23. One end of frame member 23 is fastened to the axis of roll 19 by suitable journal means, and the other end is attached to a suitable stationary support by pin means 24.

Beams 22 terminate a short distance beyond paired roll 18. Overlapping beams 22 for a short distance near the axle of roll 18 is a pair of parallel beams 25. Beams 25 are also connected to the axle of roll 18 by suitable journal means. The ends of beams 25 away from roll 18 are connected to a cantilevered spring member 26 which consists of two leaf springs 27 and frame members 28 and 29. Frame member 29 is connected to a suitable stationary support. Frame member 28 is connected to beams 25, and to shaft 30 which carries the core of a linear variable differential transformer 31.

Reference strip 13 is carried into contact with web 11 by lowering roll 18. This is effected by rod 32 fastened to beams 25 at one end and to beam 33 at the other end. Beam 33 is connected to a suitable stationary body by suitable pin means 34, and is raised and lowered by the action of power solenoid 35.

The pressure of contact of reference strip 13 against web 11 may be adjusted by placing weights on beams 22 or 25 at suitable locations thereon.

It should be noted that the reference strip 13, in the draws between rolls 16 and 18, between rolls 18 and 19, and between roll 19 and bar 20 is horizontal. This results in a balancing of forces so that variations in strip tension, should they occur, will have no effect upon the friction reading obtained.

In operation, the web 11 is moving around roll 12 at a rate of several hundred feet per minute. Reference strip 13 is driven in contact with the surface of web 11 at a constant speed of slightly over one inch per minute. The friction developed between the surface of moving web 11 and reference surface 13 tends to move beams 22 and 25 to the left, i.e., in the direction reference strip 13 is moving on its lower path. Beams 22 and 25 are free to move to the left by virtue of pin 24 of frame 23 on paired roller 19 and by virtue of the action of the cantilevered member 26 which supports the beams 25. In moving to the left, beams 22 and 25 move frame 28 to the left also which, in turn, moves shaft 30 carrying the core of the linear variable differential transformer 31. The electrical signal produced by transformer 31 is proportional to the core displacement, and an indicator or recorder receiving the signal displays a value which is directly proportional to the frictional force between the surface of moving web 11 and reference strip 13. The value so displayed may be correlated to various surface characteristics of the moving web 11, as explained heretofore. Thus, the value may be correlated to the slip characteristics if the web 11 is of a polymeric film, the surface smoothness if the web 11 is a coated web of paper, or to the degree of electric discharge treatment if the web 11 is a polyolefin film which has been treated by an electric corona discharge.

The following example illustrates the use of the process and apparatus of this invention for measuring the degree of surface treatment of a film of polyethylene which has been treated by an electric corona discharge.

*Example*

A web of polyethylene film was extruded; part of the web was treated with an electric corona discharge at various levels, and part untreated. The surface characteristics of the film were continuously measured employing the apparatus illustrated in the drawing and the roll marked at various places, the friction readings and degree of treatment of the web being recorded. The reference strip 13 employed was coated breadwrap. Samples of the film were then taken at the places marked and tested for the degree of electric discharge treatment by the Scotch tape ink stripping test. The correlation between the readings obtained from the linear variable differential transformer of the friction tester, the Scotch tape ink stripping test, and the treating level of the electric corona discharge are shown in the following table:

CORRELATION BETWEEN CONTINUOUS FRICTION TESTER READINGS AND SCOTCH TAPE INK STRIPPING TEST AT VARIOUS LEVELS OF ELECTRIC CORONA DISCHARGE TREATMENT

| Testing Level in Amperes | Continuous Friction Tester Meter Reading | Laboratory Ink Strip Test, Percent Ink Remaining |
| --- | --- | --- |
| 0.0 | 6.0 | 0 |
| 1.0 | 11.0 | 95 |
| 1.5 | 11.5 | 100 |

From the foregoing description it is seen that a process and apparatus has been described which permtis rapid and continuous measurement of the surface friction characteristics of moving webs of material. Such measurements may be correlated with such surface characteristics of webs as smoothness, slip, and, in the case of polyolefin films, to the degree of electric corona discharge treatment.

It is apparent that many modifications may be made to the invention specifically described which fall with the spirit thereof, and these are intended to be included within the scope of the following claims.

I claim:
1. The process of continuously measuring the surface friction characteristics of moving webs comprising continuously moving in contact with a surface of a web a continuously renewed reference strip, said reference strip moving at a different velocity from said web, and measuring the relative friction generated between said reference strip and the surface of said web in contact therewith.
2. The process of claim 1 wherein the relative friction measurement is correlated with a surface property of the web.
3. The process of claim 1 wherein said web is a polyolefin film and the relative friction measurement is correlated to the degree of electric corona discharge treatment.
4. An apparatus for continuously measuring the surface friction characteristics of a moving web comprising means for feeding a reference strip at a constant velocity, means for continuously urging said reference strip into contact with a moving web, and means for measuring the relative friction generated between said reference strip and said web.

References Cited

UNITED STATES PATENTS 3,152,468   10/1964   Powell _____ 73—9

LOUIS R. PRINCE, *Primary Examiner.*

JEFFREY NOLTON, *Assistant Examiner.*